(12) United States Patent
Morika (10) Patent No.: US 11,499,488 B2
(45) Date of Patent: Nov. 15, 2022

(54) SUPERCHARGING SYSTEM

(71) Applicant: SUBARU CORPORATION, Tokyo (JP)

(72) Inventor: Hiroki Morika, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/583,811

(22) Filed: Jan. 25, 2022

(65) Prior Publication Data

US 2022/0260026 A1    Aug. 18, 2022

(30) Foreign Application Priority Data

Feb. 12, 2021    (JP) .............................. JP2021-021176

(51) Int. Cl.
  *F02D 41/00*    (2006.01)
  *F01N 5/04*    (2006.01)
  (Continued)

(52) U.S. Cl.
  CPC ........... *F02D 41/0007* (2013.01); *F01N 5/04* (2013.01); *F02B 39/10* (2013.01); *F02D 41/2406* (2013.01); *F02D 41/26* (2013.01); *F03D 9/30* (2016.05); *H02J 7/14* (2013.01); *F02D 2200/0406* (2013.01);
  (Continued)

(58) Field of Classification Search
  CPC ...... F02D 41/00; F02D 41/0007; F02D 41/24; F02D 41/2406; F02D 41/26; F02D 2200/0406; F02D 2200/602; F02B 39/10; F01N 5/04; F03D 9/30; H02J 2270/20
  See application file for complete search history.

(56) References Cited

U.S. PATENT DOCUMENTS

2006/0040145 A1*    2/2006  Tokumura ............... B62K 19/30
                                                                        429/515
2011/0215641 A1*    9/2011  Peterson ................... H02J 4/00
                                                                        307/23
(Continued)

FOREIGN PATENT DOCUMENTS

JP    09-32569 A    2/1997

*Primary Examiner* — John Kwon
*Assistant Examiner* — Johnny H Hoang
(74) *Attorney, Agent, or Firm* — McDermott Will & Emery LLP (57) ABSTRACT

A supercharging system to be mounted in a vehicle including an engine, a driving operator, and an electric power storage unit includes an exhaust turbine, an intake compressor, an electric power converter, and a controller. The exhaust turbine generates electric power. The intake compressor feeds compressed intake air to the engine. The electric power converter supplies electric power from the electric power storage unit and recovers electric power to the electric power storage unit via an electric power path between the exhaust turbine and the intake compressor. The controller acquires a target value of compression power of the intake compressor, based on an operation of the driving operator and an operating state of the engine, and controls the electric power converter such that electric power corresponding to a difference between the acquired target value and the generated electric power is supplied from or recovered to the electric power storage unit.

13 Claims, 6 Drawing Sheets

(51) Int. Cl.
*F02B 39/10* (2006.01)
*F02D 41/26* (2006.01)
*F02D 41/24* (2006.01)
*F03D 9/30* (2016.01)
*H02J 7/14* (2006.01)

(52) U.S. Cl.
CPC .... *F02D 2200/602* (2013.01); *F05B 2220/60* (2013.01); *F05B 2240/941* (2013.01); *H02J 2207/20* (2020.01); *H02J 2207/50* (2020.01)

(56) References Cited

U.S. PATENT DOCUMENTS

2013/0221741 A1* 8/2013 Stanek .................... B60L 58/20
903/903
2020/0055610 A1* 2/2020 Terwilliger ............... F02C 6/14

* cited by examiner

| SUPERCHARGING PRESSURE MAP DATA | | | | |
|---|---|---|---|---|
| | REQUESTED TORQUE | | | |
| | AA Nm | BB Nm | CC Nm | DD Nm |
| ROTATIONAL SPEED — aa rpm | 10 kPa | 50 kPa | 50 kPa | 60 kPa |
| bb rpm | 10 kPa | 70 kPa | 100 kPa | 150 kPa |
| cc rpm | 10 kPa | 70 kPa | 100 kPa | 150 kPa |
| dd rpm | 10 kPa | 50 kPa | 70 kPa | 100 kPa |

| COMPRESSION POWER MAP DATA | | | | |
|---|---|---|---|---|
| | TARGET SUPERCHARGING PRESSURE | | | |
| | 10 kPa | 50 kPa | 70 kPa | ··· | 150 kPa |
| ROTATIONAL SPEED — aa rpm | 0.5 kW | 1 kW | 1 kW | ··· | 1 kW |
| bb rpm | 0.5 kW | 2 kW | 2.5 kW | ··· | 3 kW |
| cc rpm | 0.7 kW | 2 kW | 2.5 kW | ··· | 3 kW |
| dd rpm | 0.7 kW | 1.5 kW | 3 kW | ··· | 3.5 kW |

| FIRST CORRECTION TABLE DATA ||
|---|---|
| RATE OF INCREASE IN ACCELERATOR OPENING DEGREE | AMOUNT OF COMPRESSION POWER CORRECTION |
| 5% | +0.5 kW |
| 15% | +1 kW |
| 20% | +1.5 kW |
| 30% | +1.5 kW |

| SECOND CORRECTION TABLE DATA ||
|---|---|
| ERROR | AMOUNT OF COMPRESSION POWER CORRECTION |
| −15% | 2 kW |
| −5% | 0.5 kW |
| 0% | 0 kW |
| 5% | −0.5 kW |
| 15% | −2 kW |

SUPERCHARGING SYSTEM

CROSS-REFERENCE TO RELATED APPLICATIONS

The present application claims priority from Japanese Patent Application No. 2021-021176 filed on Feb. 12, 2021, the entire contents of which are hereby incorporated by reference.

BACKGROUND

The disclosure relates to a supercharging system for feeding compressed air to an engine.

In an existing mechanical supercharger, an intake compressor is driven by utilizing the rotational power of an exhaust turbine to feed compressed air from the intake compressor to an engine. Japanese Unexamined Patent Application Publication (JP-A) No. 09-32569 proposes a supercharger in which electric power is generated by utilizing the rotational power of an exhaust turbine to drive an intake compressor with the generated electric power.

SUMMARY

An aspect of the disclosure provides a supercharging system to be mounted in a vehicle. The vehicle includes an engine serving as an internal combustion engine, a driving operator configured to receive a driving operation, and a chargeable and dischargeable electric power storage unit. The supercharging system includes an exhaust turbine, an electrically powered intake compressor, an electric power converter, and a controller. The exhaust turbine is configured to generate electric power in response to receipt of exhaust from the engine. The intake compressor is configured to feed compressed intake air to the engine. The electric power converter is configured to supply electric power from the electric power storage unit and recover electric power to the electric power storage unit via an electric power path between the exhaust turbine and the intake compressor. The controller is configured to control the electric power converter. The controller is configured to acquire a target value of compression power of the intake compressor, based on an operation of the driving operator and an operating state of the engine, and control the electric power converter such that electric power corresponding to a difference between the acquired target value of the compression power and the electric power generated by the exhaust turbine is supplied from the electric power storage unit or recovered to the electric power storage unit.

An aspect of the disclosure provides a supercharging system to be mounted in a vehicle. The vehicle includes an engine serving as an internal combustion engine, a driving operator configured to receive a driving operation, and a chargeable and dischargeable electric power storage unit. The supercharging system includes an exhaust turbine, an electrically powered intake compressor, an electric power converter, and circuitry. The exhaust turbine is configured to generate electric power in response to receipt of exhaust from the engine. The intake compressor is configured to feed compressed intake air to the engine. The electric power converter is configured to supply electric power from the electric power storage unit and recover electric power to the electric power storage unit via an electric power path between the exhaust turbine and the intake compressor. The circuitry is configured to control the electric power converter. The circuitry is configured to acquire a target value of compression power of the intake compressor, based on an operation of the driving operator and an operating state of the engine. The circuitry is configured to control the electric power converter such that electric power corresponding to a difference between the acquired target value of the compression power and the electric power generated by the exhaust turbine is supplied from the electric power storage unit or recovered to the electric power storage unit.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the existing mechanical supercharger described above, since the amount of compressed air to be fed depends on the exhaust flow velocity, it is difficult to control the amount of intake air. In the supercharger disclosed in JP-A No. 09-32569, the rotational speed of the intake compressor is controlled by electrical control such that intake air having a supercharging pressure corresponding to the amount of fuel injection is supplied in a steady mode with a constant accelerator opening degree. In the control disclosed in JP-A No. 09-32569, however, there is room for improvement in the control of intake air supply to drive the engine with high efficiency in various driving conditions.

It is desirable to provide a supercharging system capable of driving an engine with high efficiency in various driving conditions.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
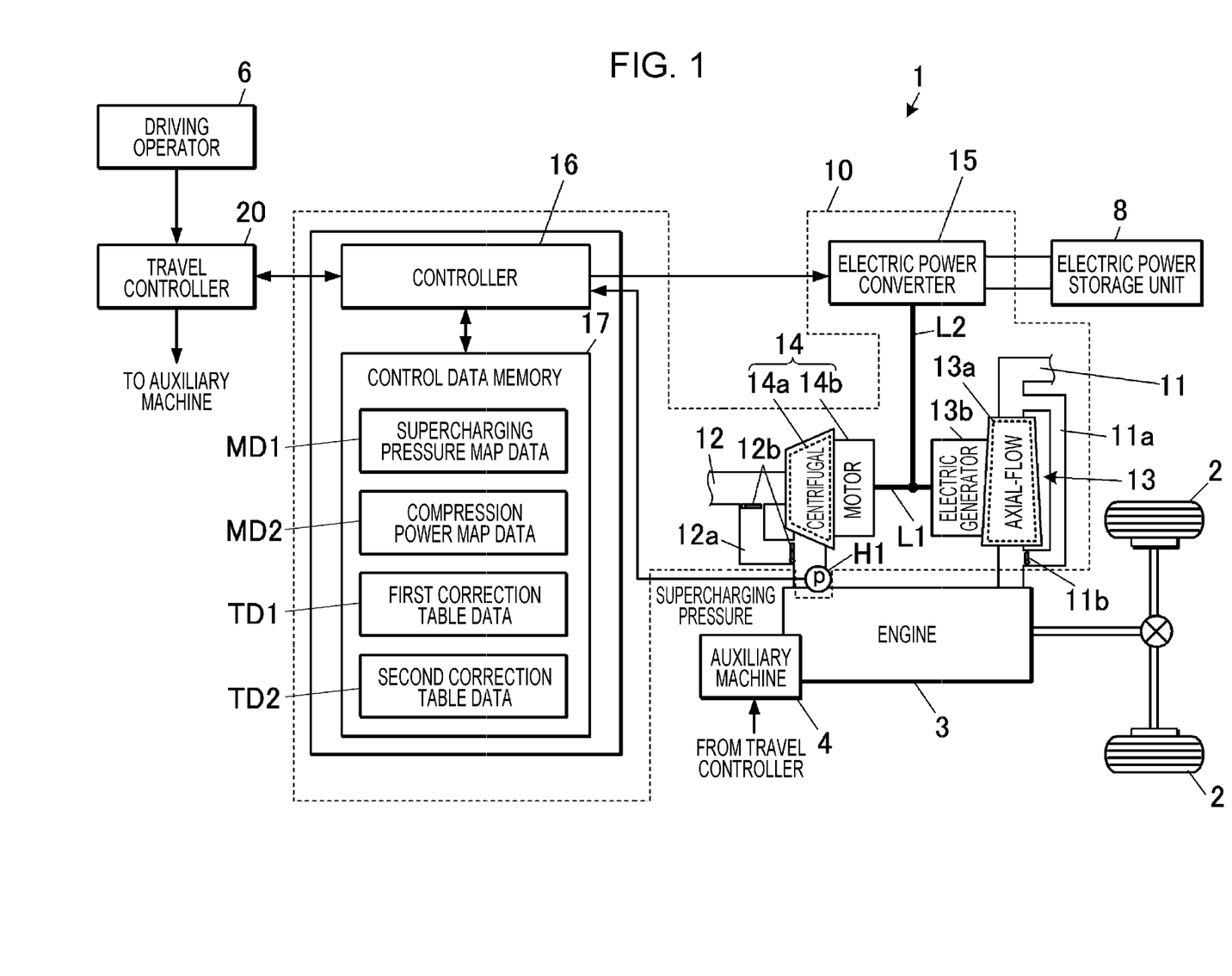
FIG. 1 is a block diagram illustrating a vehicle including a supercharging system according to an embodiment of the disclosure.

FIG. 1 is a block diagram illustrating a vehicle 1 including a supercharging system 10 according to an embodiment of the disclosure. The vehicle 1 illustrated in FIG. 1 is an engine vehicle including the supercharging system 10 according to the embodiment of the disclosure. The vehicle 1 includes drive wheels 2, an engine 3, an auxiliary machine 4, the supercharging system 10, a driving operator 6, a travel controller 20, and an electric power storage unit 8. The engine 3 serves as an internal combustion engine. The auxiliary machine 4 is used to activate the engine 3, and examples of the auxiliary machine 4 include a fuel injection device. The supercharging system 10 is an auxiliary machine of an intake and exhaust system. The driving operator 6 is operated by the driver. The travel controller 20 controls the auxiliary machine 4 and the supercharging system 10 in response to an operation signal from the driving operator 6. The electric power storage unit 8 is configured to be charged and discharged upon being coupled to the supercharging system 10. The driving operator 6 includes an accelerator operator, a brake operator, and a steering operator.

The travel controller 20 is constituted by one electronic control unit (ECU) or a plurality of ECUs that operate in cooperation with each other. In response to receipt of an operation signal from the driving operator 6 (mainly, a signal of the accelerator opening degree from the accelerator operator), the travel controller 20 controls the auxiliary machine 4 and the supercharging system 10 to drive the engine 3 in accordance with the driving operation. In one example, the travel controller 20 calculates the requested torque corresponding to the driving operation, based on the signal of the accelerator opening degree, and controls the auxiliary machine 4 and the supercharging system 10 to output the requested torque from the engine 3. The requested torque refers to an output torque to be requested for the engine 3 in accordance with the driving operation.

The supercharging system 10 includes an exhaust pipe 11 of the engine 3, an intake pipe 12 of the engine 3, an exhaust turbine 13 disposed for the exhaust pipe 11, an intake compressor 14 disposed for the intake pipe 12, an electric power line L1 disposed between the exhaust turbine 13 and the intake compressor 14, an electric power converter 15, a controller 16, and a pressure gauge H1. The electric power converter 15 is configured to supply a portion of electric power from the electric power storage unit 8 or recover a portion of electric power to the electric power storage unit 8 via the electric power line L1 and a branch line L2. The controller 16 controls the electric power converter 15. The pressure gauge H1 measures the supercharging pressure of intake air. The pressure gauge H1 is located closer to the engine 3 than a throttle valve of the intake pipe 12 and is configured to measure the pressure of intake air in this location.

The exhaust turbine 13 is disposed in the middle of the exhaust pipe 11 through which the exhaust of the engine 3 flows. The exhaust pipe 11 may include a bypass pipe 11a through which the exhaust flows while bypassing the exhaust turbine 13, and a control valve 11b configured to control the flow of the exhaust to the bypass pipe 11a. Switching of the control valve 11b may be controlled by the controller 16.

The intake compressor 14 is disposed in the middle of the intake pipe 12 through which the intake air of the engine 3 flows. The intake pipe 12 may include a bypass pipe 12a through which the intake air flows while bypassing the intake compressor 14, and control valves 12b configured to control the flow of the intake air to the bypass pipe 12a. Switching of the control valves 12b may be controlled by the controller 16.

The exhaust turbine 13 includes a rotor 13a rotatable in response to exhaust, and an electric generator 13b configured to generate electric power in response to the rotational motion of the rotor 13a. The exhaust turbine 13 is an axial-flow turbine including the rotor 13a having a rotary shaft along the flow of the exhaust. When used as an axial-flow turbine, the exhaust turbine 13 is configured such that the input pipe and the output pipe are easily disposed coaxially with each other. The axial flow configuration of the exhaust turbine 13, which can be operated with high efficiency at a high exhaust flow velocity, provides high electric power recovery efficiency when the engine 3 is a high-rotation engine. The exhaust turbine 13 outputs the generated electric power to the electric power line L1.

The intake compressor 14 is a centrifugal compressor including a rotor 14a configured to compress intake air, and an electric motor 14b configured to rotationally drive the rotor 14a, such that intake air is sucked in the axial direction of the rotor 14a and compressed air is output to the outside in the radial direction of the rotor 14a. When used as a centrifugal compressor, the intake compressor 14 is configured such that the input pipe and the output pipe easily intersect each other. In one example, the input pipe and the output pipe are perpendicular to each other. The intake compressor 14 is driven in response to receipt of electric power from the electric power line L1.

The electric power line L1 has an end coupled to the electric generator 13b of the exhaust turbine 13, and another end coupled to the electric motor 14b of the intake compressor 14. The electric power line L1 may include, between the exhaust turbine 13 and the intake compressor 14, a relay or the like that is turned on whenever the supercharging system 10 is in operation, or a rectifier element for preventing current from flowing back toward the electric generator 13b.

The electric power converter 15 is disposed in the branch line L2 coupled to the electric power line L1. The electric power converter 15 is disposed between the electric power line L1 and the electric power storage unit 8 and is configured to recover electric power from the electric power line L1 to the electric power storage unit 8 and supply electric power from the electric power storage unit 8 to the electric power line L1. The electric power converter 15 includes a power semiconductor switch. The power semiconductor switch is driven to control the flow of electric power.

The controller 16 receives information indicating the operation of the driving operator 6 (e.g., the requested torque) and information indicating the operating state of the engine 3 (e.g., the rotational speed of the engine 3) from the travel controller 20. The controller 16 also receives information on the supercharging pressure from the pressure gauge H1. The controller 16 controls the electric power converter 15 based on the received information. The controller 16 is constituted by one ECU or a plurality of ECUs that operate in cooperation with each other. The controller 16 may be integrated with the travel controller 20.

The controller 16 includes a control data memory 17 that stores control data for controlling the electric power converter 15. The control data memory 17 stores supercharging pressure map data MD1, compression power map data MD2, first correction table data TD1, and second correction table data TD2. In an embodiment of the disclosure, the supercharging pressure map data MD1 corresponds to an example of first map data. In an embodiment of the disclosure, the compression power map data MD2 corresponds to an example of second map data.

Figure 2A:
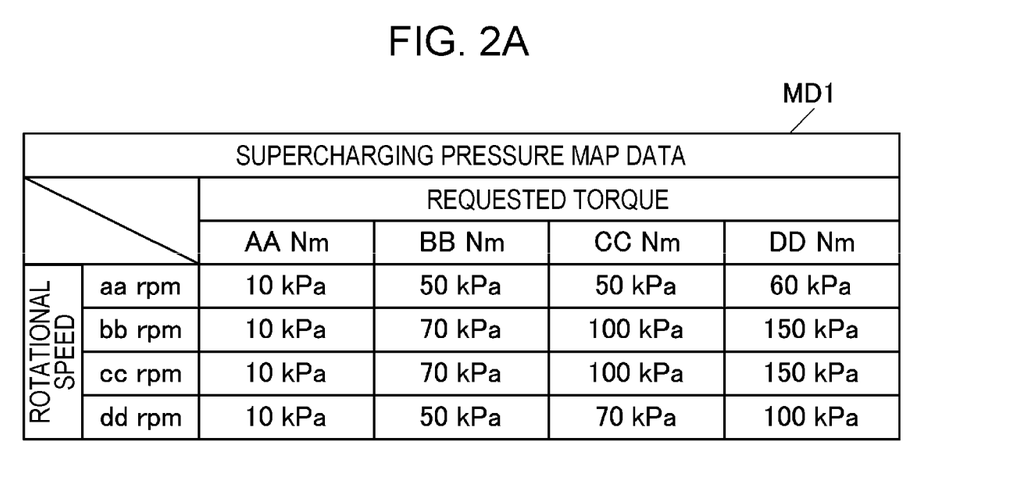
FIGS. 2A and 2B are diagrams illustrating an example of supercharging pressure map data and compression power map data stored in a control data memory, respectively.
Figure 2B:
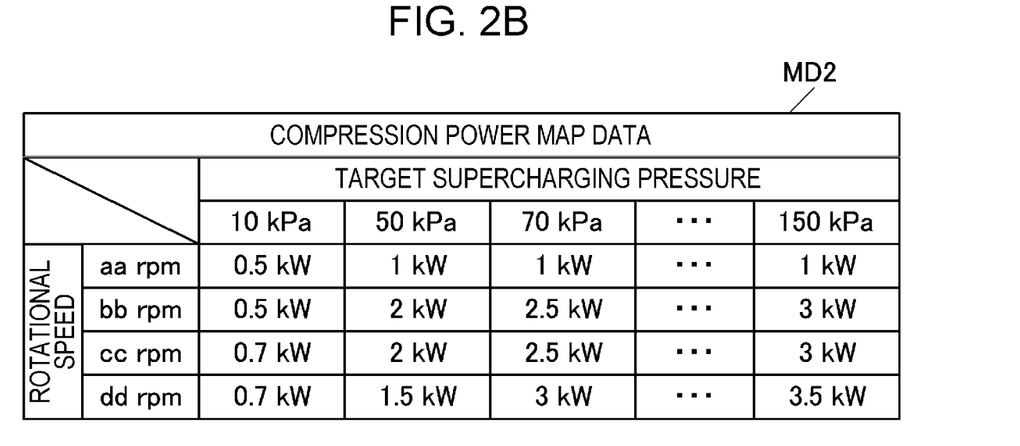
Figure 3A:
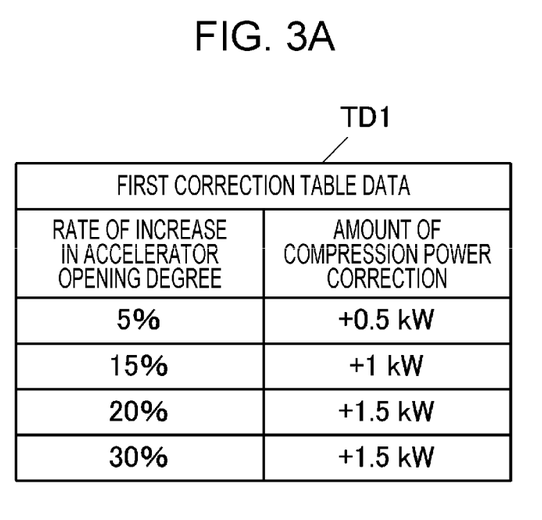
FIGS. 3A and 3B are diagrams illustrating an example of first correction table data and second correction table data stored in the control data memory, respectively.
Figure 3B:
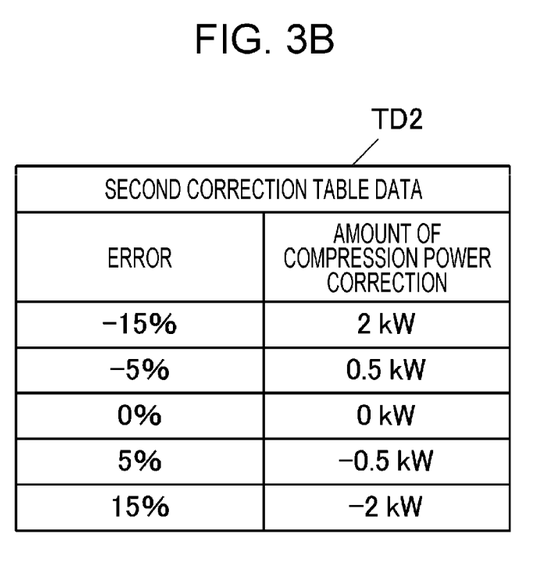

FIGS. 2A and 2B are diagrams illustrating an example of the supercharging pressure map data MD1 and the compression power map data MD2 stored in the control data memory 17, respectively. FIGS. 3A and 3B are diagrams illustrating an example of the first correction table data TD1 and the second correction table data TD2 stored in the control data memory 17, respectively.

The supercharging pressure map data MD1 indicates a relationship among the operating state (e.g., the rotational speed) of the engine 3, a quantity related to the operation of the driving operator 6 (e.g., a requested torque), and a supercharging pressure of intake air corresponding to the operating state and the quantity. The compression power map data MD2 indicates a relationship among the operating state (e.g., the rotational speed) of the engine 3, a supercharging pressure of intake air, and the compression power (e.g., the operating power) of the intake compressor 14 to be used to output the supercharging pressure in the operating state.

The first correction table data TD1 indicates a relationship between a specific operation (e.g., a rapid accelerator operation) of the driving operator 6 and a correction value of the compression power described above corresponding to the specific operation. The rapid accelerator operation is an accelerator operation in which the rate of increase in the amount of operation of the accelerator pedal per predetermined time interval is greater than or equal to a preset threshold, and a plurality of stages of specific operations are set in accordance with the rate of increase. The second correction table data TD2 indicates a correction value for reducing an error between a target supercharging pressure and an actual supercharging pressure. The first correction table data TD1 and the second correction table data TD2 indicate correction values of the compression power (i.e., the operating power).

Operation

Figure 4:
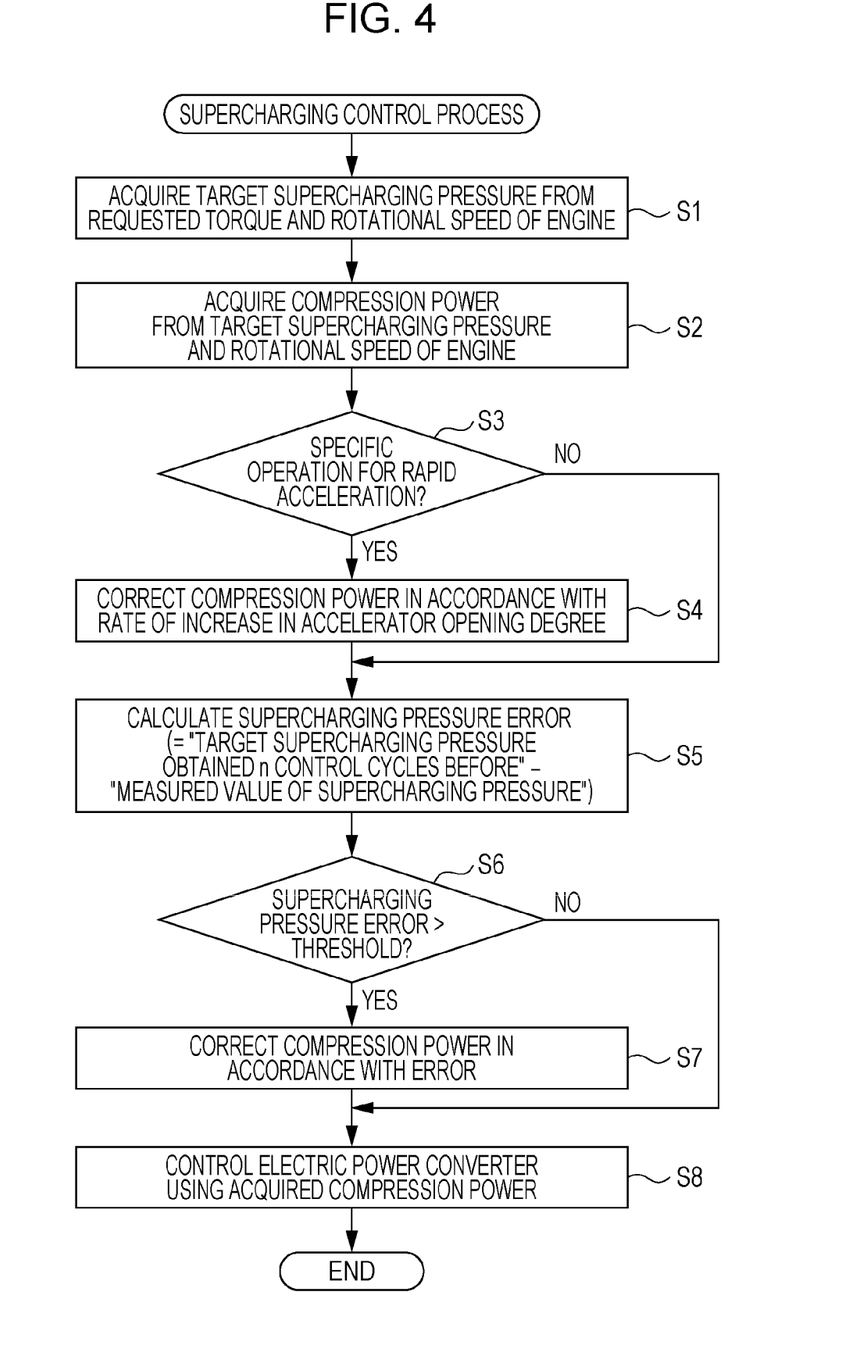
FIG. 4 is a flowchart illustrating a supercharging control process executed by a controller.

FIG. 4 is a flowchart illustrating a supercharging control process executed by the controller 16. During the driving of the engine 3, the controller 16 repeatedly executes the supercharging control process illustrated in FIG. 4 for each predetermined control cycle. Upon start of a control cycle, first, the controller 16 refers to the supercharging pressure map data MD1 and acquires, from information related to the operation of the driving operator 6 (e.g., a requested torque) and the operating state (e.g., the rotational speed) of the engine 3, a target value of the supercharging pressure of intake air (hereinafter referred to as "target supercharging pressure") corresponding to the operation of the driving operator 6 and the operating state of the engine 3 described above (step S1).

Then, the controller 16 refers to the compression power map data MD2 and acquires the compression power of the intake compressor 14 (e.g., the operating power of the intake compressor 14) to be used to output the target supercharging pressure in the operating state of the engine 3 in the current control cycle (step S2). The value of the compression power acquired in step S2 corresponds to a target value of the compression power to be output from the intake compressor 14 under the control of the controller 16.

Then, the controller 16 determines whether a specific operation requesting rapid acceleration (e.g., a rapid accelerator operation) is performed (step S3). The travel controller 20 notifies the controller 16 if the specific operation is performed. If the determination result of step S3 is YES, the controller 16 refers to the first correction table data TD1 to determine an amount of correction of the compression power (e.g., the operating power of the intake compressor 14) corresponding to the amount of the specific operation, and applies the amount of correction to the compression power (step S4).

Then, the controller 16 compares a target supercharging pressure obtained n control cycles before the current control cycle (e.g., the immediately preceding control cycle or a plurality of control cycles before the current control cycle) with a supercharging pressure measured with the pressure gauge H1 at the timing when intake air is output under control in the control cycle, and calculates a supercharging pressure error (step S5). Then, the controller 16 determines whether the supercharging pressure error exceeds a threshold (e.g., ±5%) (step S6). If the determination result is YES, the controller 16 refers to the second correction table data TD2 to determine an amount of correction of the compression power (e.g., the operating power of the intake compressor 14) corresponding to the error, and applies the amount of correction to the compression power (step S7).

Then, the controller 16 controls the electric power converter 15 such that the intake compressor 14 operates with the finally obtained compression power of the intake compressor (step S8). Through the control described above, the difference between the operating power of the intake compressor 14 and the electric power generated by the exhaust turbine 13 is supplied from the electric power storage unit 8 or recovered to the electric power storage unit 8 through the electric power converter 15. Through the control in step S8, the intake compressor 14 is supplied with electric power corresponding to the compression power, and the compression power is output from the intake compressor 14. Then, the supercharging control process in the current control cycle ends. In the next control cycle, the controller 16 again executes the supercharging control process in step S1.

Specific Example of Electrical Configuration of Supercharging System

Figure 5A:
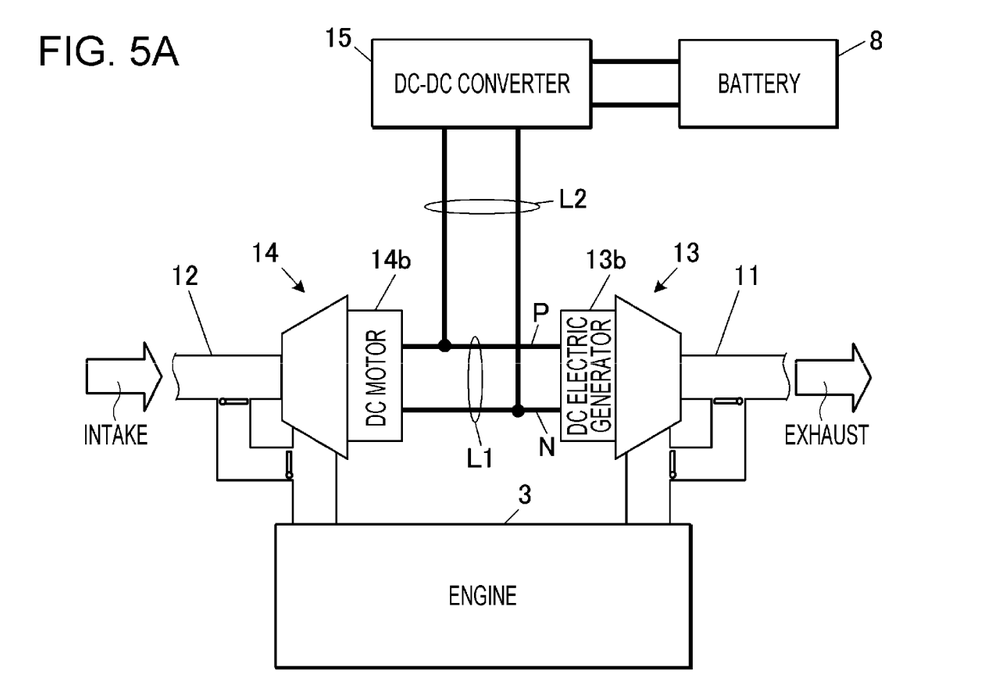
FIGS. 5A and 5B are diagrams illustrating a first example and a second example of an exhaust turbine, an intake compressor, an electric power converter, and electric power lines among them, respectively.
Figure 5B:
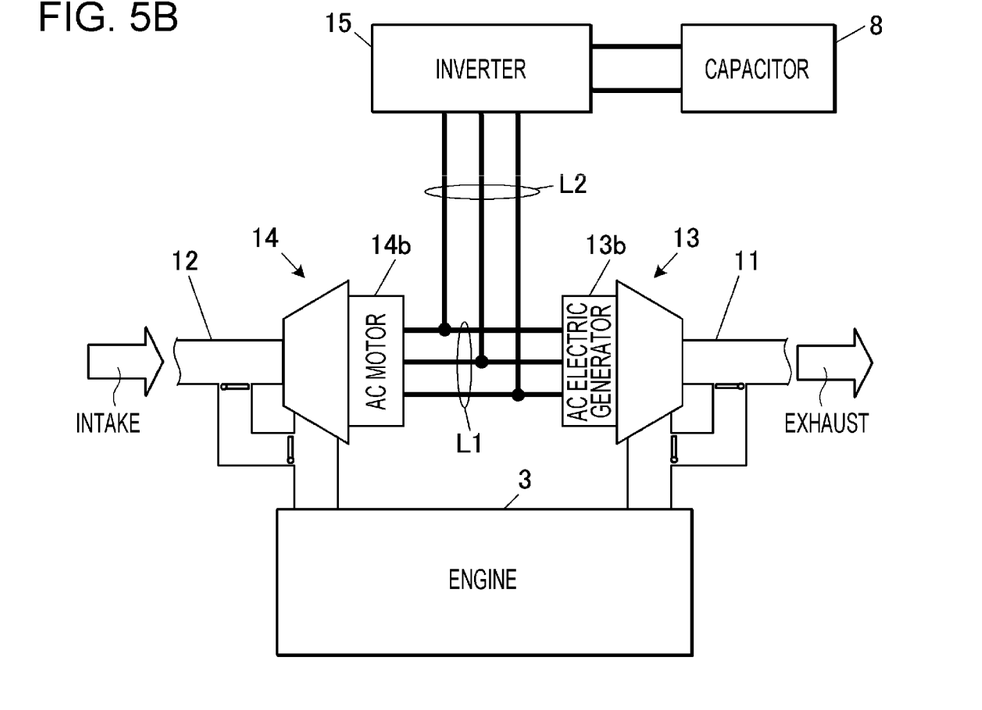

FIGS. 5A and 5B are diagrams illustrating a first example and a second example indicating the exhaust turbine 13, the intake compressor 14, the electric power converter 15, and electric power lines among them. In FIGS. 5A and 5B, the exhaust turbine 13 is a centrifugal turbine, for example. The exhaust turbine 13 may be an axial-flow turbine. Also, the intake compressor 14 may be an axial-flow compressor.

In the first example illustrated in FIG. 5A, the electric generator 13b of the exhaust turbine 13 is a direct-current (DC) electric generator configured to generate DC power, and the electric motor 14b of the intake compressor 14 is a DC motor that is driven in response to the DC power. In this configuration, the electric power line L1 and the branch line L2 may be DC two-wire electric power lines each having an anode line P and a cathode line N. The electric power converter 15 may be a DC/DC converter configured to convert a DC voltage of the electric power storage unit 8 into a DC voltage of the electric power line L1. The electric power storage unit 8 may be a battery (such as a lithium ion secondary battery or a lead battery) or a capacitor (such as an electric double layer capacitor). In the example illustrated in FIG. 5A, the electric power storage unit 8 is a battery.

In the configuration in the first example, the controller 16 controls the output voltage of the electric power converter 15 (i.e., the voltage of the electric power line L1) to a value corresponding to the intended compression power of the intake compressor 14 to appropriately supply electric power from the electric power storage unit 8 or recover electric power to the electric power storage unit 8 in accordance with the electric power generated by the exhaust turbine 13. As a result, the intake compressor 14 can be driven with the target compression power (e.g., the operating power).

In one example, in the configuration in the first example, when the rotational speed of the engine 3 is constant, as the voltage of the electric power line L1 increases, the rotational speed of the intake compressor 14 increases, resulting in an increase in the operating power and compression power of the intake compressor 14. Accordingly, the supercharging pressure of the intake air increases. In contrast, as the voltage of the electric power line L1 decreases, the rotational speed of the intake compressor 14 decreases, resulting in a decrease in the operating power and compression power of the intake compressor 14. Accordingly, the supercharging pressure of the intake air decreases. If the rotational speed of the exhaust turbine 13 is low and the generated electric power from the exhaust turbine 13 is small, the effect of increasing the voltage of the electric power line L1 in response to the supply of the generated electric power is reduced, and the electric power to be fed from the electric power storage unit 8 to the electric power line L1 in accordance with the control of the output voltage of the electric power converter 15 is increased accordingly. In contrast, if the rotational speed of the exhaust turbine 13 is high and the electric power generated by the exhaust turbine 13 is large, the effect of increasing the voltage of the electric power line L1 in response to the supply of the generated electric power is increased, and the electric power to be fed from the electric power storage unit 8 to the electric power line L1 in accordance with the control of the output voltage of the electric power converter 15 is reduced accordingly. Alternatively, if the electric power generated by the exhaust turbine 13 is further large, electric power is recovered from the electric power line L1 to the electric power storage unit 8 in accordance with the control of the output voltage of the electric power converter 15. With the effect described above, the difference between the electric power generated by the exhaust turbine 13 and the compression power (i.e., the operating power) of the intake compressor 14 is supplied from the electric power storage unit 8 or recovered to the electric power storage unit 8, and the intake compressor 14 can be driven with the target compression power.

In the second example illustrated in FIG. 5B, the electric generator 13b of the exhaust turbine 13 is a three-phase alternating-current (AC) electric generator, and the electric motor 14b of the intake compressor 14 is a three-phase AC electric motor. In this configuration, the electric power line L1 and the branch line L2 may be three-phase three-wire electric power lines. The electric power converter 15 may be an inverter capable of converting a DC voltage of the electric power storage unit 8 into a three-phase AC voltage. The electric power storage unit 8 may be a battery (such as a lithium ion secondary battery or a lead battery) or a capacitor (such as an electric double layer capacitor). In the example illustrated in FIG. 5B, the electric power storage unit 8 is a capacitor.

In the configuration in the second example, the controller 16 controls the output voltage of the electric power converter 15 (i.e., the three-phase AC voltage output to the electric power line L1) to an AC voltage corresponding to a target value of the compression power to appropriately supply electric power from the electric power storage unit 8 or recover electric power to the electric power storage unit 8 in accordance with the electric power generated by the exhaust turbine 13. As a result, the intake compressor 14 can be driven with the target compression power (e.g., the operating power).

In one example, in the configuration in the second example, the electric power converter 15 outputs an AC voltage for driving by the intake compressor 14 at a predetermined torque and a predetermined rotational speed. As a result, the intake compressor 14 is driven with the compression power corresponding to the predetermined torque and the predetermined rotational speed (e.g., the operating power). Accordingly, a supercharging pressure corresponding to the compression power is obtained. At this time, the electric power generated by the exhaust turbine 13 is fed to the electric power line L1. In accordance with the control of the AC voltage of the electric power converter 15, the electric power converter 15 operates such that the difference between the electric power generated by the exhaust turbine 13 and the operating power of the intake compressor 14 is supplied from the electric power storage unit 8 or recovered to the electric power storage unit 8.

When the electric generator 13b of the exhaust turbine 13 is three-phase AC electric generator and the electric motor 14b of the intake compressor 14 is a three-phase AC electric motor, the following configuration may be used: The electric power line L1 and the branch line L2 are DC two-wire lines, the intake compressor 14 is coupled to the electric power line L1 via a first inverter, the exhaust turbine 13 is coupled to the electric power line L1 via a second inverter, and the branch line L2 is coupled to the electric power storage unit 8. In this configuration, the controller 16 controls the first inverter to drive the intake compressor 14 with the target compression power (e.g., the operating power), and controls the second inverter to recover electric power with high efficiency in accordance with the rotational speed of the exhaust turbine 13. Even this configuration can implement an operation in which the difference between the electric power generated by the exhaust turbine 13 and the compression power (i.e., the operating power) of the intake compressor 14 is supplied from the electric power storage unit 8 or recovered to the electric power storage unit 8 via the first inverter and the second inverter. A rectifier element such as a power diode may be disposed between the first inverter and the second inverter to prevent electric power from being fed to the exhaust turbine 13.

In the configurations illustrated in FIGS. 5A and 5B, the controller 16 is configured such that the electric power generated by the exhaust turbine 13 is not measured and the excess or deficiency of the electric power is supplied from the electric power storage unit 8 or recovered to the electric power storage unit 8 via the electric power converter 15 to drive the intake compressor 14 with the target compression power. Alternatively, the supercharging system 10 may include a measurement device configured to measure a quantity related to the amount of electric power generated by the exhaust turbine 13 (such as the rotational speed of the rotor 13a), and the controller 16 may recognize the generated electric power by using the value of the measurement device and calculate the excess or deficiency of the electric power to control the electric power converter 15 to supply or recover electric power corresponding to the excess or deficiency.

Modifications of Intake Compressor and Exhaust Turbine

Figure 6A:
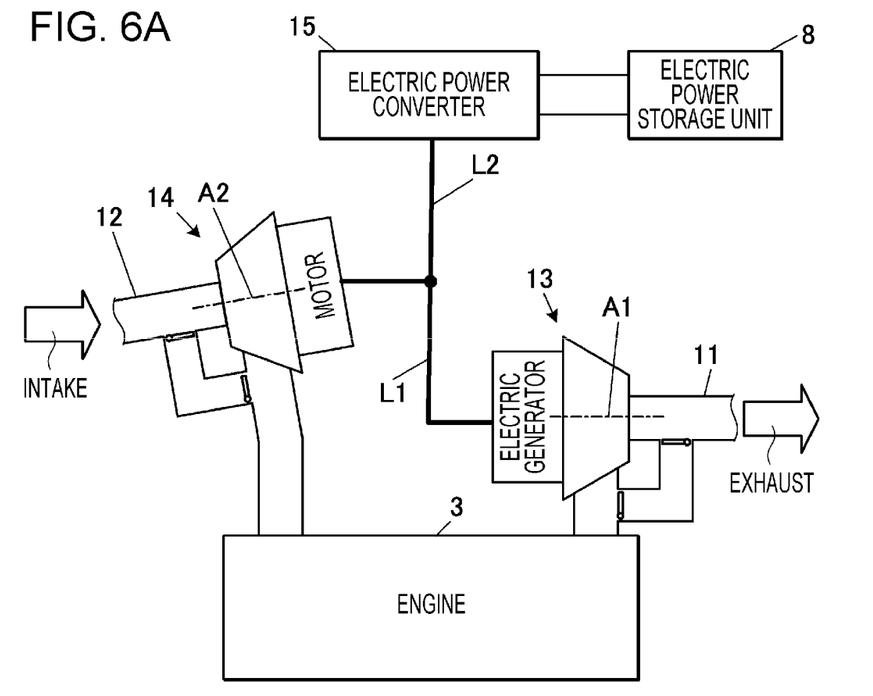
FIGS. 6A and 6B are diagrams illustrating a first modification and a second modification of the exhaust turbine and the intake compressor, respectively.
Figure 6B:
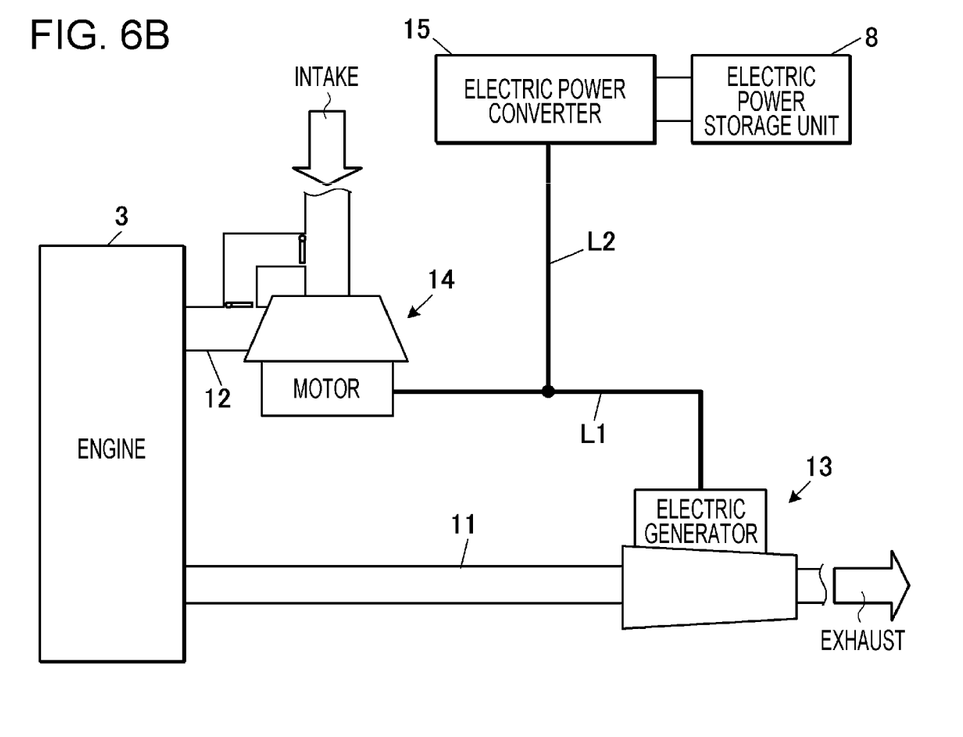

FIGS. 6A and 6B are diagrams illustrating a first modification and a second modification of the intake compressor 14 and the exhaust turbine 13, respectively. In the supercharging system 10 according to this embodiment, kinetic energy recovered by the exhaust turbine 13 is converted into electric power, and the electric power is fed to the intake compressor 14. In the supercharging system 10, therefore, the exhaust turbine 13 and the intake compressor 14 are disposed more flexibly than those in a mechanical supercharger in which kinetic energy is fed from the exhaust turbine directly to the intake compressor. The supercharging system 10 having such flexibility may provide configurations according to the first modification and the second modification.

In the first modification, as illustrated in FIG. 6A, the exhaust turbine 13 and the intake compressor 14 are a centrifugal turbine and a centrifugal compressor, respectively, and are disposed such that a rotary shaft A1 of a rotor of the exhaust turbine 13 and a rotary shaft A2 of a rotor of the intake compressor 14 are not aligned coaxially with each other.

In the second modification, as illustrated in FIG. 6B, the exhaust pipe 11 and the intake pipe 12 are spaced apart from each other, and the exhaust turbine 13 and the intake compressor 14 are disposed apart from each other.

The type and layout of the exhaust turbine 13 and the intake compressor 14 are not limited to those in the examples illustrated in FIGS. 1, 6A, and 6B, and may be changed in various ways. For example, the rotary shaft A1 of the rotor of the exhaust turbine 13 and the rotary shaft A2 of the rotor of the intake compressor 14 may be coaxial with each other, and the intake compressor 14 may be an axial-flow compressor. Alternatively, the exhaust turbine 13 and the intake compressor 14 may be disposed to face in any direction in accordance with the exhaust pipe 11 and the intake pipe 12.

When an axial-flow exhaust turbine or an axial-flow intake compressor are used, a high-efficiency operation is implemented at a high flow velocity of the exhaust or intake air. Thus, a supercharging system when adopted in a high-rotation engine provides high efficiency. When a centrifugal exhaust turbine or a centrifugal intake compressor is used, a high-efficiency operation is implemented at a low flow velocity of the exhaust or intake air. Thus, a supercharging system when adopted in a low-rotation engine provides high efficiency. As described above, the types of the exhaust turbine 13 and the intake compressor 14 are selected to support engines having various characteristics, improving supercharging efficiency.

Since the exhaust turbine 13 and the intake compressor 14 can be disposed flexibly in accordance with the installation space for the components when the vehicle 1 is designed, the supercharging system can be easily installed even if the installation space is limited.

As described above, the supercharging system 10 according to this embodiment includes the exhaust turbine 13 configured to generate electric power in response to receipt of exhaust from the engine 3, the intake compressor 14 configured to operate with the electric power, and the electric power converter 15 capable of supplying electric power from the electric power storage unit 8 or recovering electric power to the electric power storage unit 8 via an electric power path (the electric power line L1) between the exhaust turbine 13 and the intake compressor 14. The controller 16 determines a target value of the compression power (e.g., the operating power) of the intake compressor 14 to be used, based on an operation of the driving operator 6 and an operating state of the engine 3, and controls the electric power converter 15 such that electric power corresponding to the difference between the determined target value of the compression power and the electric power generated by the exhaust turbine 13 is supplied from or recovered to the electric power storage unit 8. This control allows intake air to be fed to the engine 3 with a supercharging pressure corresponding to various driving conditions such as requesting various output torques at a low rotational speed of the engine 3 and requesting various output torques at a high rotational speed of the engine 3. Accordingly, the engine 3 can be driven with high efficiency in various driving conditions. Since the electric power converter 15 is configured to supply electric power to the electric power line L1 or recover electric power from the electric power line L1 between the exhaust turbine 13 and the intake compressor 14, most of the electric power generated by the exhaust turbine 13 is transmitted to the intake compressor 14 without the intervention of the electric power storage unit 8. Thus, power efficiency is improved, which contributes to efficient driving of the engine 3.

In the supercharging system 10 according to this embodiment, furthermore, the controller 16 includes the supercharging pressure map data MD1 indicating a relationship among the operating state (e.g., the rotational speed) of the engine 3, a quantity indicating the operation of the driving operator 6 (e.g., a requested torque), and a supercharging pressure of intake air corresponding to the operating state and the quantity. The controller 16 further includes the compression power map data MD2 indicating a relationship among the operating state (e.g., the rotational speed) of the engine 3, the supercharging pressure, and the compression power (e.g., the operating power) of the intake compressor 14 for generating the supercharging pressure in the operating state.

The controller 16 determines the intended compression power (e.g., operating power) of the intake compressor 14 by using the supercharging pressure map data MD1 and the compression power map data MD2. Accordingly, the controller 16 can appropriately determine the supercharging pressure corresponding to the operating state of the engine 3 and the operation of the driving operator 6 with a small load.

The supercharging system 10 according to this embodiment further includes the pressure gauge H1 configured to measure a supercharging pressure of intake air, and the controller 16 corrects the target value of the compression power acquired by using the compression power map data MD2 in response to a difference between the target supercharging pressure acquired by using the supercharging pressure map data MD1 and a measured value of the pressure gauge H1. This correction process can increase the accuracy of the supercharging pressure of the intake air to be actually supplied from the intake compressor 14. In addition, since the controller 16 acquires a target supercharging pressure by using the supercharging pressure map data MD1, a process for determining the difference between the actual supercharging pressure and the target supercharging pressure is facilitated.

In the supercharging system 10 according to this embodiment, furthermore, in response to a specific operation (e.g., a rapid accelerator operation) via the driving operator 6, the controller 16 corrects the target value of the compression power (e.g., the operating power) of the intake compressor 14 in accordance with a change in the amount of operation of the accelerator pedal with time. Temporary correction of the supercharging pressure of the intake air in response to a specific operation of the driving operator 6 may improve the driving efficiency of the engine 3. Accordingly, the correction process described above enables control of the supercharging pressure in response to a specific operation of the driving operator 6, further improving the driving efficiency of the engine 3.

In the supercharging system 10 according to this embodiment, furthermore, as illustrated in FIG. 5A, the exhaust turbine 13 may include a DC electric generator, the intake compressor 14 may include a DC motor, and the electric power converter 15 may be a DC/DC converter. With this configuration, most of the electric power generated by the exhaust turbine 13 can be fed to the intake compressor 14 without the intervention of the electric power storage unit 8. The excess or deficiency of electric power can be supplied or recovered via the electric power converter 15. Thus, the energy of the exhaust of the engine 3 can efficiently be utilized as energy for generating the supercharging pressure, which contributes to efficient driving of the engine 3 accordingly.

An embodiment of the disclosure has been described. However, the disclosure is not limited to the embodiment described above. In the embodiment described above, in one example, the rotational speed of the engine 3 is used as a parameter indicating the operating state of an engine according to an embodiment of the disclosure. However, the operating state of the engine may be represented by any other parameter such as an amount of fuel injection, an ignition time, or a load. In the embodiment described above, furthermore, in one example, a requested torque is used as a quantity indicating an operation of a driving operator according to an embodiment of the disclosure. However, the quantity indicating the operation of the driving operator may be any other quantity such as requested power (a requested value of the output power of the engine) or an amount of operation of the accelerator operator. In the embodiment described above, furthermore, in one example, a target value of the operating power of the intake compressor 14 is used as a target value of compression power according to an embodiment of the disclosure. However, the specific value may be changed in various ways. For example, if the compression power is determined according to an input voltage input to the electric motor 14b of the intake compressor 14, the target value of the input voltage may be used as the target value of the compression power. In addition, details presented in the embodiment may be changed as appropriate without departing from the spirit of the disclosure.

According to an embodiment of the disclosure, based on an operation of the driving operator (e.g., a requested torque corresponding to a driving operation) and the operating state of the engine (e.g., the rotational speed of the engine), a target value of the compression power (e.g., the power consumption) of the intake compressor corresponding to the operation and operating state described above is acquired. The electric power converter is controlled such that compression power corresponding to the target value is output from the intake compressor. This configuration enables supply of intake air such that the engine can be driven with high efficiency in various driving conditions with different operations of the driving operator and different operating states of the engine. According to an embodiment of the disclosure, furthermore, electric power is supplied from the electric power storage unit or recovered to the electric power storage unit via an electric power path between the exhaust turbine and the intake compressor. Thus, electric power corresponding to the target value of the compression power can be supplied to the intake compressor. Accordingly, most of the electric power generated by the exhaust turbine is transmitted to the intake compressor without the intervention of the electric power storage unit. Thus, power efficiency is improved, which contributes to efficient driving of the engine.

The controller 16 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 16 including the control data memory 17 storing the supercharging pressure map data MD1, the compression power map data MD2, the first correction table data TD1, and the second correction table data TD2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A supercharging system to be mounted in a vehicle, the vehicle including an engine serving as an internal combustion engine, a driving operator configured to receive a driving operation, and a chargeable and dischargeable electric power storage unit, the supercharging system comprising:

an exhaust turbine configured to generate electric power in response to receipt of exhaust from the engine;

an electrically powered intake compressor configured to feed compressed intake air to the engine;

an electric power converter configured to supply electric power from the electric power storage unit and recover electric power to the electric power storage unit via an electric power path between the exhaust turbine and the intake compressor; and a controller configured to control the electric power converter, wherein the controller is configured to acquire a target value of compression power of the intake compressor, based on an operation of the driving operator and an operating state of the engine, and control the electric power converter such that electric power corresponding to a difference between the acquired target value of the compression power and the electric power generated by the exhaust turbine is supplied from the electric power storage unit or recovered to the electric power storage unit.

2. The supercharging system according to claim 1, wherein the controller comprises:

first map data indicating a relationship among the operation, the operating state, and a supercharging pressure of intake air corresponding to the operation and the operating state; and second map data indicating a relationship among the operating state, the supercharging pressure, and the compression power for generating the supercharging pressure in the operating state, and the controller is configured to acquire the target value of the compression power by using the first map data and the second map data.

3. The supercharging system according to claim 2, further comprising a measurement device configured to measure the supercharging pressure of the intake air, wherein the controller is configured to, in response to a difference between a supercharging pressure of the intake air acquired from the first map data and the supercharging pressure measured by the measurement device, correct the target value of the compression power in accordance with the difference.

4. The supercharging system according to claim 3, wherein the driving operator comprises an accelerator operator, and the controller is configured to correct the target value of the compression power to be a value larger than the target value in response to a rate of increase in an amount of operation of the accelerator operator being greater than or equal to a threshold.

5. The supercharging system according to claim 3, wherein the exhaust turbine comprises a direct current electric generator, the intake compressor comprises a direct current motor configured to output compression power, and the electric power converter is a direct current-direct current converter.

6. The supercharging system according to claim 4, wherein the exhaust turbine comprises a direct current electric generator, the intake compressor comprises a direct current motor configured to output compression power, and the electric power converter is a direct current-direct current converter.

7. The supercharging system according to claim 2, wherein the driving operator comprises an accelerator operator, and the controller is configured to correct the target value of the compression power to be a value larger than the target value in response to a rate of increase in an amount of operation of the accelerator operator being greater than or equal to a threshold.

8. The supercharging system according to claim 7, wherein the exhaust turbine comprises a direct current electric generator, the intake compressor comprises a direct current motor configured to output compression power, and the electric power converter is a direct current-direct current converter.

9. The supercharging system according to claim 2, wherein the exhaust turbine comprises a direct current electric generator, the intake compressor comprises a direct current motor configured to output compression power, and the electric power converter is a direct current-direct current converter.

10. The supercharging system according to claim 1, wherein the driving operator comprises an accelerator operator, and the controller is configured to correct the target value of the compression power to be a value larger than the target value in response to a rate of increase in an amount of operation of the accelerator operator being greater than or equal to a threshold.

11. The supercharging system according to claim 10, wherein the exhaust turbine comprises a direct current electric generator, the intake compressor comprises a direct current motor configured to output compression power, and the electric power converter is a direct current-direct current converter.

12. The supercharging system according to claim 1, wherein the exhaust turbine comprises a direct current electric generator, the intake compressor comprises a direct current motor configured to output compression power, and the electric power converter is a direct current-direct current converter.

13. A supercharging system to be mounted in a vehicle, the vehicle including an engine serving as an internal combustion engine, a driving operator configured to receive a driving operation, and a chargeable and dischargeable electric power storage unit, the supercharging system comprising:

an exhaust turbine configured to generate electric power in response to receipt of exhaust from the engine;

an electrically powered intake compressor configured to feed compressed intake air to the engine;

an electric power converter configured to supply electric power from the electric power storage unit and recover electric power to the electric power storage unit via an electric power path between the exhaust turbine and the intake compressor; and circuitry configured to
control the electric power converter,
acquire a target value of compression power of the intake compressor, based on an operation of the driving operator and an operating state of the engine, and
control the electric power converter such that electric power corresponding to a difference between the acquired target value of the compression power and the electric power generated by the exhaust turbine is supplied from the electric power storage unit or recovered to the electric power storage unit.

* * * * *